United States Patent
Yuan

(10) Patent No.: US 10,222,582 B1
(45) Date of Patent: Mar. 5, 2019

(54) FOLDABLE TELESCOPE FOR MOBILE DEVICE REAR CAMERA

(71) Applicant: Guangwei Yuan, Fort Collins, CO (US)

(72) Inventor: Guangwei Yuan, Fort Collins, CO (US)

( * ) Notice: Subject to any disclaimer, the term of this patent is extended or adjusted under 35 U.S.C. 154(b) by 176 days.

(21) Appl. No.: 15/153,736

(22) Filed: May 13, 2016

Related U.S. Application Data

(60) Provisional application No. 62/167,895, filed on May 29, 2015.

(51) Int. Cl.
| | | |
|---|---|---|
| *G02B 23/00* | (2006.01) | |
| *G02B 13/00* | (2006.01) | |
| *G02B 7/02* | (2006.01) | |
| *G02B 7/00* | (2006.01) | |
| *G03B 17/56* | (2006.01) | |
| *G02B 23/16* | (2006.01) | |

(52) U.S. Cl.
CPC .......... *G02B 13/001* (2013.01); *G02B 7/006* (2013.01); *G02B 7/021* (2013.01); *G02B 7/023* (2013.01); *G03B 17/565* (2013.01); *G02B 23/16* (2013.01)

(58) Field of Classification Search
CPC ........ G02B 7/003; G02B 7/004; G02B 7/006; G02B 7/02; G02B 7/021; G02B 7/022; G02B 7/023; G02B 23/00; G02B 23/16; G02B 23/20

USPC ....... 359/399, 400, 401, 423, 425, 428, 429, 359/434, 435, 811, 819, 821, 822, 827
See application file for complete search history.

(56) References Cited

U.S. PATENT DOCUMENTS

| | | | | |
|---|---|---|---|---|
| 4,443,071 A | * | 4/1984 | Ueda | G02B 23/18 359/399 |
| 4,981,346 A | * | 1/1991 | Marschner | G02B 23/08 359/402 |
| 5,321,547 A | * | 6/1994 | Zapp | G02B 23/16 359/402 |
| 2015/0338635 A1 | * | 11/2015 | Gantz | G02B 25/002 345/32 |
| 2016/0113489 A1 | * | 4/2016 | Myung | A61B 3/117 351/206 |
| 2017/0269340 A1 | * | 9/2017 | Shmunk | G02B 13/0055 |

FOREIGN PATENT DOCUMENTS

CN           202841267 U   *   3/2013

* cited by examiner

*Primary Examiner* — Arnel C Lavarias

(57) ABSTRACT

A foldable lens system attached to a protection case or cover that can be used as a telescope for mobile device rear camera. A compact lens system that can be easily stored. The lens holders are self-aligned concentrically to the rear camera through the alignment and recessed structure on the lens holders and the case. This system can be scaled through adding or removing some lens holders.

12 Claims, 5 Drawing Sheets matched alignment structures

FOLDABLE TELESCOPE FOR MOBILE DEVICE REAR CAMERA

TECHNICAL FIELD

The present invention relates a foldable lens system attached to a protection case or cover that can be used as a telescope for mobile device rear camera.

BACKGROUND

Currently, mobile device rear cameras are designed so compact that it limits optical zoom. Off-the-shelf external lens are made bulky. For this reason, external lens are required to be stored separately.

SUMMARY OF THE INVENTION

To solve this problem, this present lens system is designed. When unfolded, it can be laid flat in a recessed structure. To use, just simply fold the lens to form a telescope. With appropriately chosen lens type and focus length, a telescope lens system can be achieved.

The present invention has the following beneficial effects over conventional external telescope lens for mobile devices: 1) it can be provided by a compact lens system that can be easily stored. 2) The lens holders are self-aligned concentrically to the rear camera through the alignment and recessed structure on the lens holders and the case. 3) This system can be scaled through adding or removing some lens holders.

Additional Notes

The object of the present invention is to provide a novel telescope system for the mobile device rear camera. Although the present invention have been described in detail for purposes of design, additional modifications and enhancements may be made without departing from the essence and scope of the present invention. Such like, adding or removing a certain number of lens holders to modify the telescope is also possible, however, with some modification to the recessed structure.

DETAILED DESCRIPTION OF THE DRAWINGS

Figure 1:
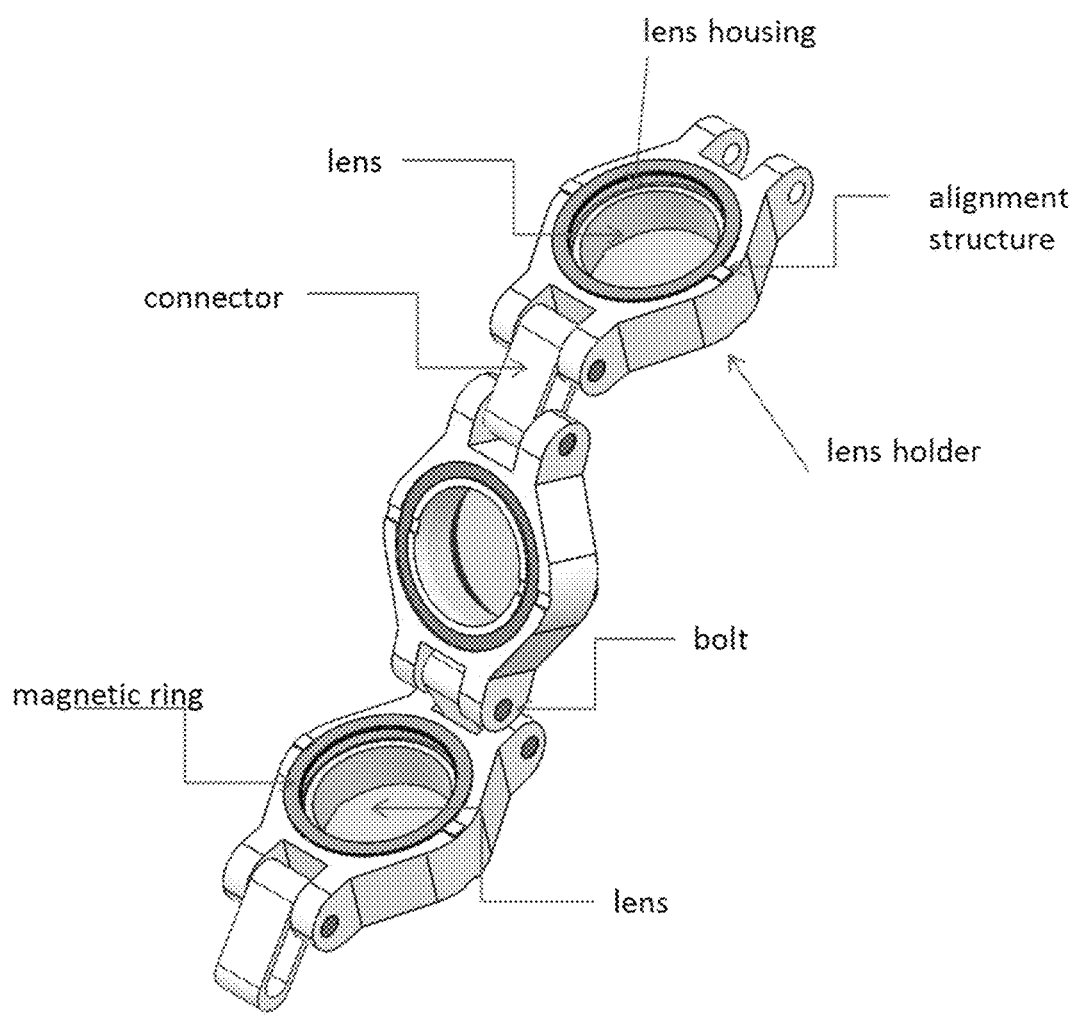
FIG. 1 is a view of the foldable telescope lens system viewed from front side.
2)
Figure 2:
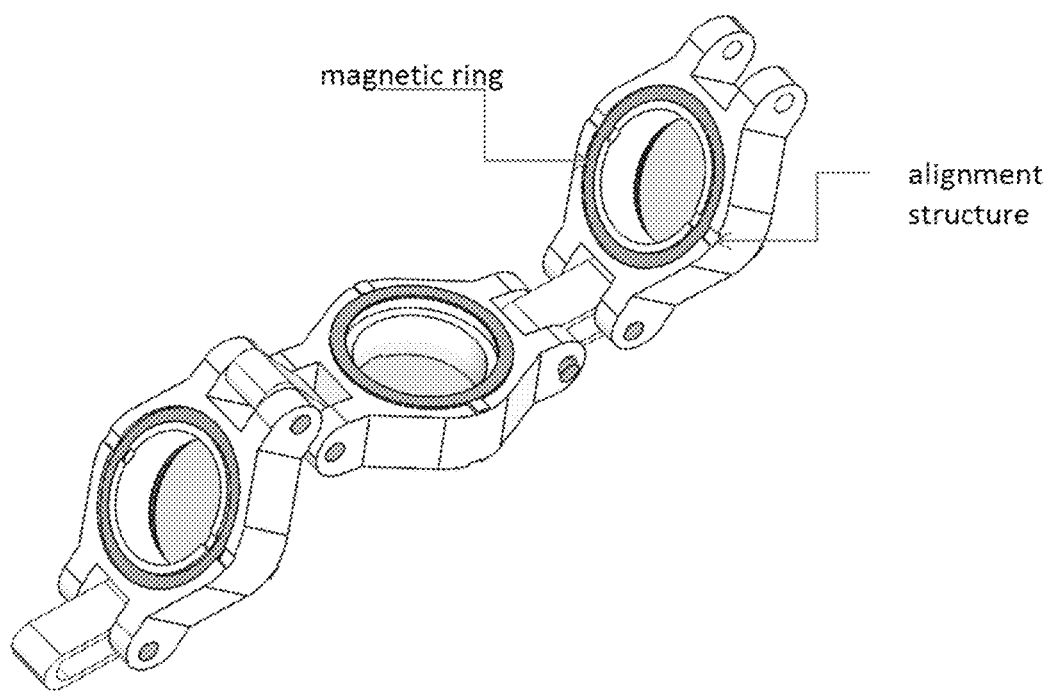
FIG. 2 is a view of the foldable telescope lens system viewed from back side.
3)

1) FIG. 1 and FIG. 2. demonstrate a foldable telescope designed for mobile device rear camera. Multiple lens holders are connected together through connectors. A joint structure includes a connector linked to a small bolt attached to the holders as seen. The holder has an opening in the center. Two magnetic rings are bonded on the two surfaces of the holder. Each holder contains a lens or lens group, or filters, or just nothing. There are alignment structures and magnetic rings between two holders. Each holder has a lens house with a stop layer. The lens group is secured in the lens house. Alignment structures are on the holder's two surfaces. This structure help keeping holders aligned concentrically.

Figure 3:
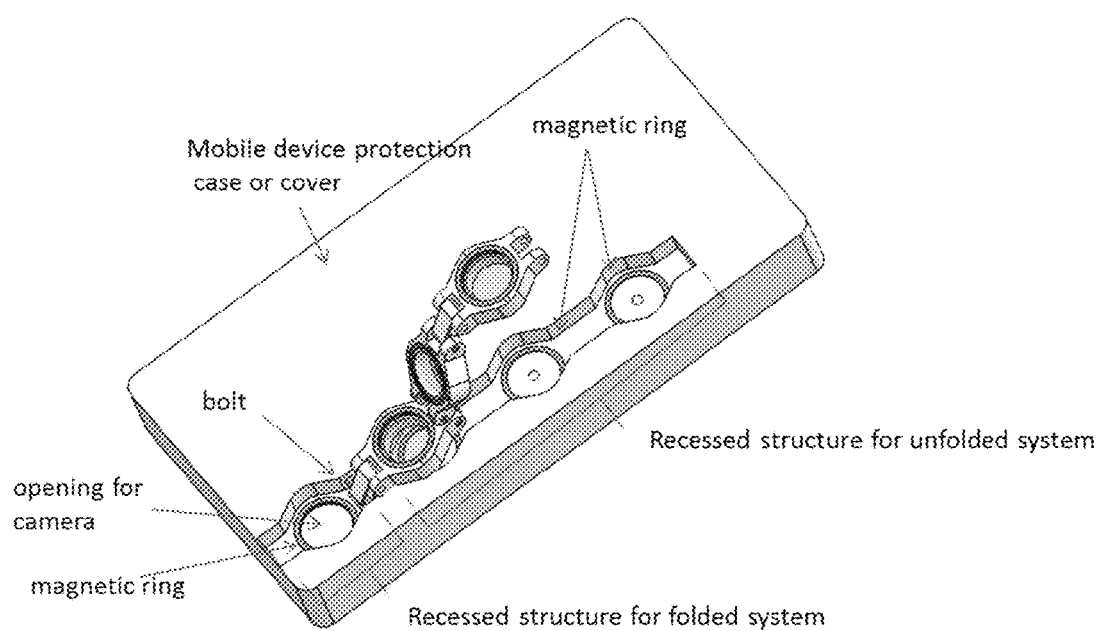
FIG. 3 is an assembled lens system on mobile device back case
4)

2) FIG. 3 shows that lens system is connected to a mobile device protection case or cover. The base of the system is the mobile device protection case or cover. The lens system is connected to a mobile device protection case or cover through a bolt. The lens system can be rotated around the bolt on the case, changing from telescope mode to storage mode. The case is cut out two recessed structures. One is roughly in the shape of the unfolded lens system. The other one is concentric to the rear camera lens with an opening for the camera.

Figure 4:
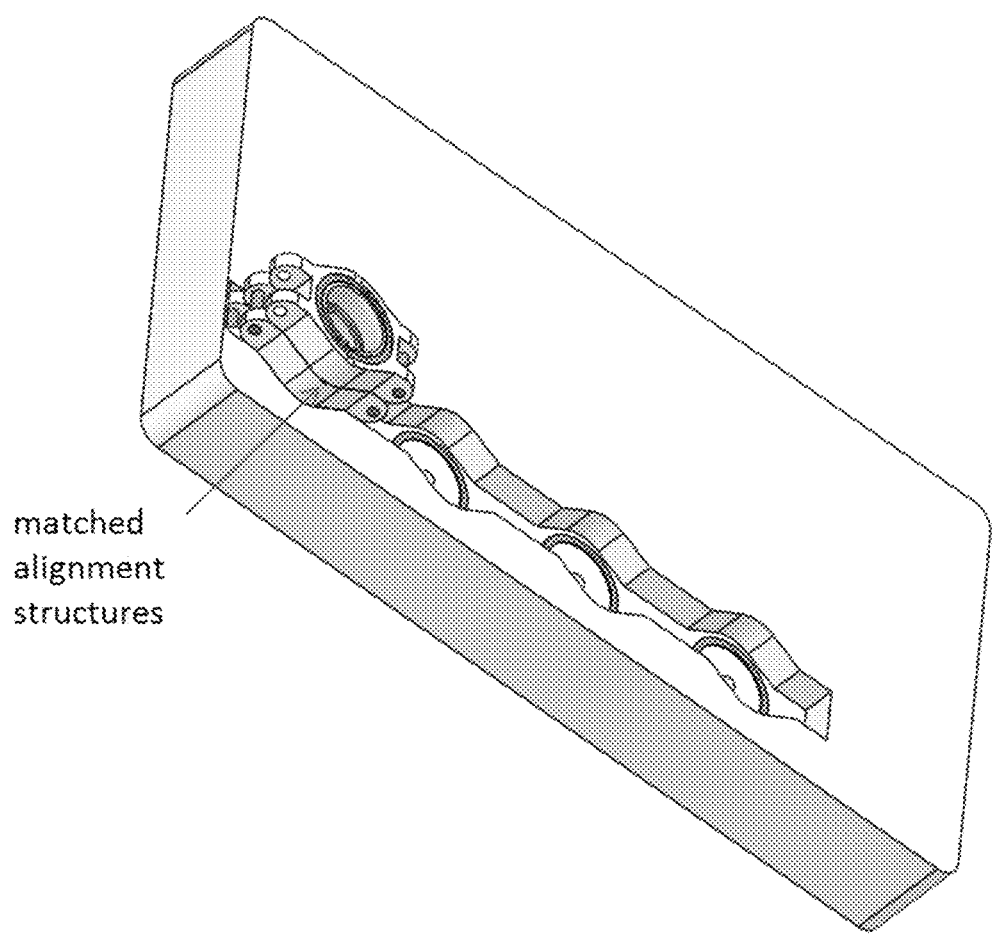
FIG. 4 is a folded lens system for mobile device rear camera
5)

3) FIG. 4 shows that a telescope system can be formed by folding the holders. When the lens system is folded, the holders are attracted to each other through the magnetic force. The folded lens system is attached to the other recessed structure lower surface through magnetic force. Alignment structure is used to keep the folded lens system concentric to camera lens.

Figure 5:
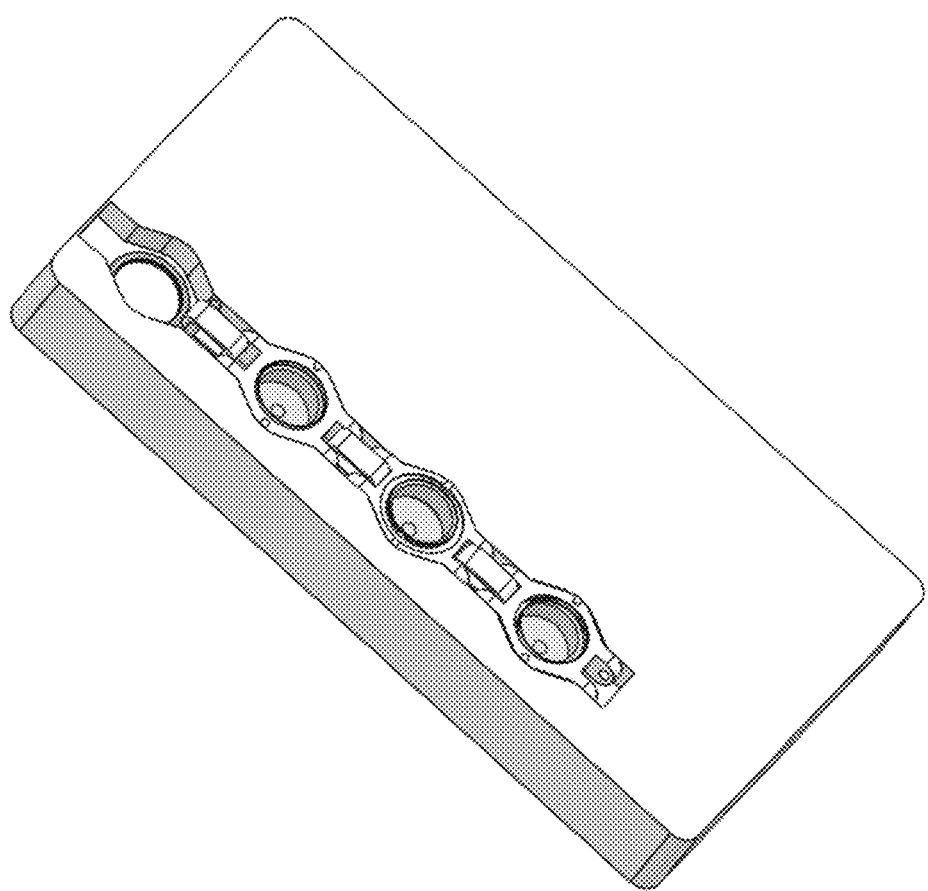
FIG. 5 is a unfolded lens system

4) FIG. 5 shows that a telescope system can be stored in a recessed structure in the protection case or cover. The unfolded lens system can be laid flat in one of the recessed structures. When laid flat, the lens system outer surface is roughly in the same plane as the protection case or cover outer surface. The unfolded lens system can be secured in recessed structure through magnetic force from the magnetic rings, or from elastic force from the side walls.

The invention claimed is:

1. A foldable telescope, designed for mobile device rear cameras, comprising in combination:
    a lens system that consists of lenses, connectors, and multiple lens holders connected together through connectors;
    wherein the lens system is connected to a mobile device protection case or cover using a connector and a bolt;
    wherein each holder contains a lens or lens group, or filters, or just nothing;
    wherein a telescope is formed by folding the holders;
    wherein there are alignment structures and magnetic rings between two holders;
    wherein the telescope is stored in a recessed structure in the protection case or cover;
    wherein an unfolded lens system is defined as that holders are spread out;
    wherein a folded lens system is defined as that the holders are stacked up;
    wherein upper and lower surfaces of the lens holders are top bases and bottom bases of the holders respectively.

2. The foldable telescope in claim 1, wherein said connector is linked to a small bolt attached to the holders.

3. The foldable telescope in claim 1, wherein the magnetic rings are bonded on the upper and lower surfaces of a holder.

4. The foldable telescope in claim 1, wherein said each holder has a lens house with a stop layer and the lens group is secured in the lens house.

5. The foldable telescope in claim 1, wherein said when the lens system is folded, the holders are attracted to each other by magnetic rings.

6. The foldable telescope in claim 1, wherein said alignment structures are on the holder's upper and lower surfaces and the structures help keeping holders aligned concentrically.

7. The foldable telescope in claim 1, wherein said the lens system is connected to the mobile device protection case or cover through a bolt.

8. The foldable telescope in claim 1, wherein said the lens system rotates around the connector and the bolt on the case or cover, changing from telescope mode to storage mode.

9. The foldable telescope in claim 1, wherein the case or cover is cut out two recessed structures, one for lens system in telescope mode, and one for lens system in storage mode.

10. The foldable telescope in claim 1, wherein the unfolded lens system is laid flat in one of the recessed structures.

11. The foldable telescope in claim 1, wherein the unfolded lens system is secured in the recessed structure through magnetic force from the magnetic rings.

12. The foldable telescope in claim 1, wherein the folded lens system is attached to the recessed structure through magnetic force from the magnetic rings, and alignment structures are used to keep the folded lens system concentric to camera lens.

* * * * *